(12) United States Patent
Ashley et al.

(10) Patent No.: US 6,657,802 B1
(45) Date of Patent: Dec. 2, 2003

(54) PHASE ASSISTED SYNCHRONIZATION DETECTOR

(75) Inventors: Jonathan Ashley, Los Gatos, CA (US); Isaiah Carew, Santa Cruz, CA (US)

(73) Assignee: Infineon Technologies Corporation, San Jose, CA (US)

( * ) Notice: Subject to any disclaimer, the term of this patent is extended or adjusted under 35 U.S.C. 154(b) by 0 days.

(21) Appl. No.: 09/435,333

(22) Filed: Nov. 5, 1999

Related U.S. Application Data

(60) Provisional application No. 60/152,390, filed on Sep. 3, 1999, and provisional application No. 60/129,654, filed on Apr. 16, 1999.

(51) Int. Cl.⁷ .............................................. G11B 5/09
(52) U.S. Cl. .......................................... 360/51; 360/46
(58) Field of Search ........................ 360/51, 46, 65

(56) References Cited

U.S. PATENT DOCUMENTS

| | | | |
|---|---|---|---|
| 4,743,463 A | 5/1988 | Ronn et al. | |
| 4,897,740 A | 1/1990 | Suzuki | 360/51 |
| 5,363,360 A | 11/1994 | Fairchild | |
| 5,379,160 A | 1/1995 | Otani | 360/49 |
| 5,572,558 A | 11/1996 | Beherns | 375/376 |
| 5,726,818 A | 3/1998 | Reed et al. | 360/51 |
| 5,729,396 A | 3/1998 | Dudley et al. | 360/51 |
| 5,760,984 A | 6/1998 | Spurbeck et al. | 360/51 |
| 5,793,548 A * | 8/1998 | Zook | 360/51 |
| 5,812,334 A | 9/1998 | Behrens et al. | 360/40 |
| 5,835,295 A | 11/1998 | Behrens | 360/51 |
| 5,892,632 A | 4/1999 | Behrens et al. | 360/51 |
| 5,909,331 A | 6/1999 | Behrens et al. | |
| 5,909,332 A | 6/1999 | Spurbeck et al. | 360/51 |
| 6,023,386 A * | 2/2000 | Reed et al. | 360/51 |
| 6,108,151 A * | 8/2000 | Tuttle et al. | 360/51 |

FOREIGN PATENT DOCUMENTS

| | | |
|---|---|---|
| EP | 0 002 738 A1 | 7/1979 |
| WO | WO 95/25639 | 9/1995 |

* cited by examiner

*Primary Examiner*—Andrew L. Sniezek
*Assistant Examiner*—Dan I. Davidson
(74) *Attorney, Agent, or Firm*—Fish & Richardson P.C.

(57) ABSTRACT

A synchronization detector including a phase detector and a distance metric calculator. The phase detector uses the preamble readback signal to estimate the bit periods and outputs a signal indicative of this estimate. This signal is sued by the distance metric calculator to limit its search for the synchronization mark to every mth bit position, where m is a predetermined integer greater than one (1).

10 Claims, 3 Drawing Sheets

| | | Preamble | | | | | | | Sync Mark | | | | | | |
|---|---|---|---|---|---|---|---|---|---|---|---|---|---|---|---|
| Signal | | 0 | 2 | 0 | -2 | 0 | 2 | 0 | -2 | -1 | 0 | 1 | 2 | 1 | -1 | -2 |
| Detected Phase | | 3 | 0 | 1 | 2 | 3 | 0 | 1 | 2 | 3 | 0 | 1 | 2 | 3 | 0 | 1 |
| Phase Estimate Signal | | | | | | | | | | | | | | | | |

| Shift | EPR4 Sequence | Metric |
|---|---|---|
| 0 | 0 -2 0 2 0 -2 0 2 0 -2 -1 0 1 2 1 -1 -2 | 0 |
| 4 | 0 -2 0 2 0 -2 -1 0 1 2 1 -1 -2 . . . . | 36 |
| 8 | 0 -2 -1 0 1 2 1 -1 -2 . . . . . . . . | 36 |

| EPR4 Sequence | Metric |
|---|---|
| 0 -2 0 2 0 -2 0 2 0 -2 0 2 0 -2 -1 0 1 2 1 -1 -2 -1 0 0 1 2 1 0 | 0 |
| 0 -2 0 2 0 -2 0 2 0 -2 0 2 1 0 -1 -2 -1 1 2 1 0 0 -1 -2 -1 0 . . | 37 |
| 0 -2 0 2 0 -2 0 2 0 -2 -1 0 1 2 1 -1 -2 -1 0 0 1 2 1 0 . . . . | 66 |
| 0 -2 0 2 0 -2 0 2 1 0 -1 -2 -1 1 2 1 0 0 -1 -2 -1 0 . . . . . . | 54 |
| 0 -2 0 2 0 -2 -1 0 1 2 1 -1 -2 -1 0 0 1 2 1 0 . . . . . . . . | 39 |
| 0 -2 0 2 1 0 -1 -2 -1 1 2 1 0 0 -1 -2 -1 0 . . . . . . . . . . | 53 |
| 0 -2 -1 0 1 2 1 -1 -2 -1 0 0 1 2 1 0 . . . . . . . . . . . . | 62 |
| 1 0 -1 -2 -1 1 2 1 0 0 -1 -2 -1 0 . . . . . . . . . . . . . . | 63 |

PHASE ASSISTED SYNCHRONIZATION DETECTOR

CROSS-REFERENCE TO RELATED APPLICATIONS

This application claims priority from U.S. Provisional Application Serial No. 60/152,390, filed Sep. 3, 1999, and from U.S. Provisional Application Serial No. 60/129,654, filed Apr. 16, 1999.

BACKGROUND OF THE INVENTION

The present invention relates to magnetic recording and, particularly, to an improved synchronization detector.

Sampled amplitude detectors used in magnetic recording require timing recovery in order to correctly extract the digital sequence. As shown in FIG. 1, data sectors 100 on magnetic disks are formatted to include an acquisition preamble 102, a sync or synchronization mark 104, and user data 106. Timing recovery uses the acquisition preamble 102 to acquire the correct sampling frequency and phase before reading the user data 106. The synchronization mark 104 demarcates the beginning of the user data.

The preamble 102 is written using the periodic non-return-to-zero (NRZ) sequence 001100110011 ... which causes the pattern of magnetization SSNNSSNNSSNN ... to be written on the magnetic medium. The pattern is periodic, having period 4T, where T is the bit period. The pattern is sometimes called a 2T pattern because the interval between successive magnetic field direction transitions is 2T. During the read operation, the sequence of samples [$x_i$, $x_{i+1}$, ... ], produced by the preamble is also of period 4T. In the case of PR4 (partial response) equalization, the sequence is ideally [1,1,-1,-1,1,1,-1,-1,1,1, ... ,]. In the case of EPR4 (extended partial response) equalization, it is [2,0,-2,0,2,0,-2,0,2,0, ... ]. In the general case of E$^n$PR4, it is the convolution [1,1]$^n$ *[1,1,-1,-1,1,1,-1,-1,1,1, ... ].

The preamble 102, the sync mark 104, and the user data 106 are read in succession. Reading the preamble 102 establishes bit synchronization. Reading the sync mark 104 establishes the absolute bit index of the first bit of the user data 106. Once bit synchronization is established, the sync mark 104 is searched for beginning at each possible bit index (i.e., at each possible start value in the sequence) within a predetermined qualification window, the onset and time-out of which are a priori parameters. Typically, this search is done by calculating a distance metric between the ideal sequence of signal samples [$s_0, s_1, \ldots, s_{L-1}$] expected at the synchronization mark 104 and each block of received samples [$x_i, x_{i+1}, \ldots, x_{i+L-1}$], where the index i runs through all the bit indices in the qualification window. Typically, the first index i for which the metric does not exceed a qualification threshold is asserted to be the location of the synchronization mark 104.

The prior art suffers from disadvantages in that a period T clock is required to clock the synchronization detector. In addition, a relatively long synchronization mark is required.

SUMMARY OF THE INVENTION

These and other drawbacks in the prior art are overcome in large part by a system and method according to the present invention. According to one implementation, a synchronization detector uses the periodicity of the preamble to limit the search for the synchronization mark. In one implementation, the search is limited to one bit phase in each block of four (4) bits. In another implementation, the search is limited to one bit phase per block of two (2) bits.

Briefly, the synchronization mark is written beginning at a known, fixed phase of the periodic preamble pattern. The signal phase estimate obtained in the course of reading the preamble is used to limit the search for the synchronization marks to the bit positions whose phase matches the estimate of the fixed, known phase.

A synchronization detector according to an embodiment of the invention includes a phase detector and a distance metric calculator. The phase detector uses the preamble readback signal to estimate the bit periods and outputs a signal indicative of this estimate. This signal is used by the distance metric calculator to limit its search for the synchronization mark to every mth bit position, where m is a predetermined integer greater than one (1).

Advantageously, the present invention allows the synchronization detector to operate on a period mT clock. Thus, the synchronization detector may use a lower speed, less expensive clock. In addition, the synchronization detector may be relatively shorter than required when m=1 to achieve a given probability of correct synchronization in the presence of noise.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 2–6 illustrate an improved synchronization detector according to an implementation of the present invention. The synchronization detector according to an embodiment of the invention uses phase information from the immediately preceding preamble to restrict the search for the synchronization mark to a particular bit phase.

Figure 2:
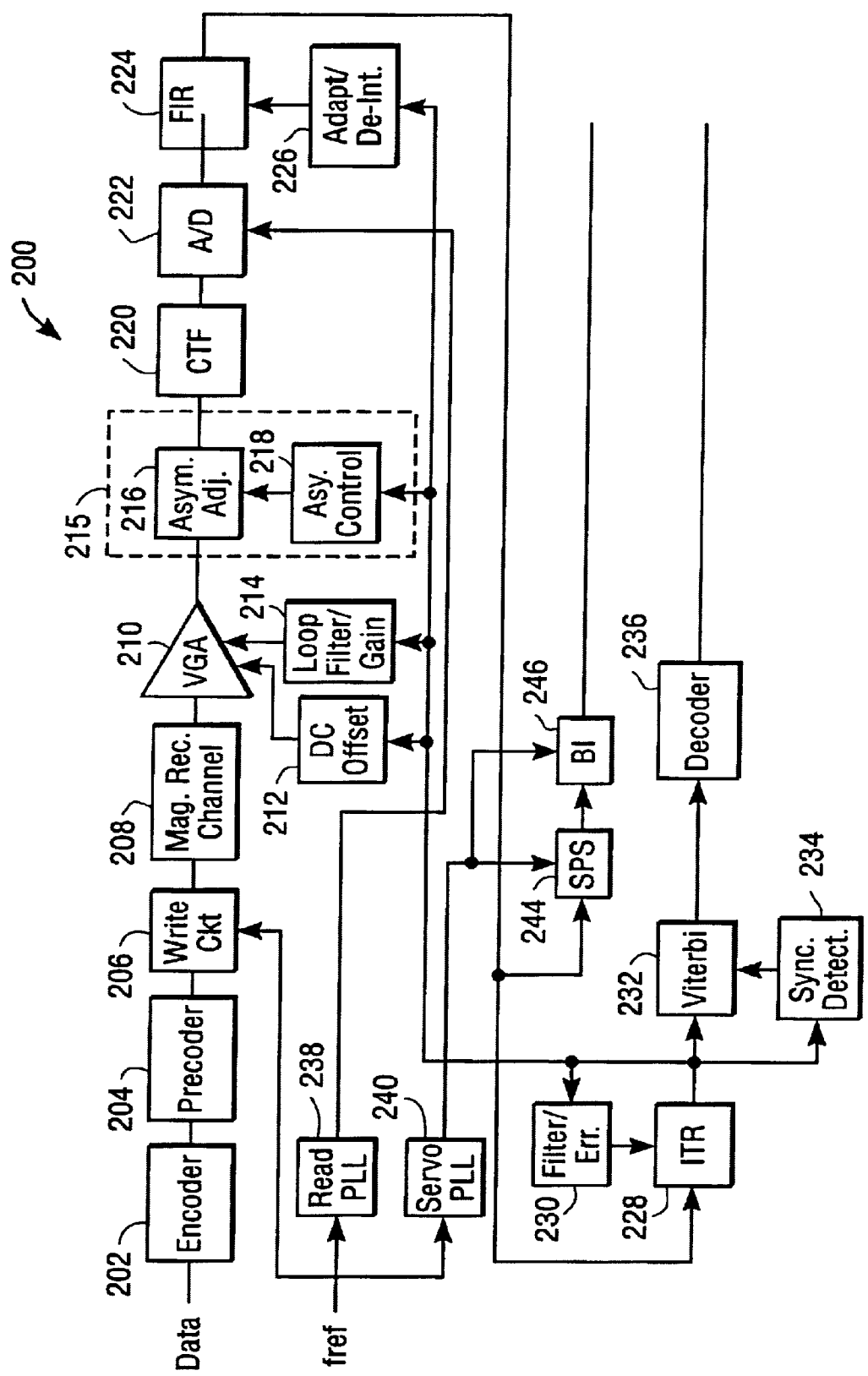
FIG. 2 is a block diagram of an exemplary read/write channel according to an embodiment of the invention.

Turning now to the drawings and, with particular attention to FIG. 2, a block diagram of a sampled amplitude read channel according to an embodiment of the invention is shown and identified by the reference numeral 200. During a write operation, data are written onto the media. The data are encoded in an encoder 202, such as an RLL or other encoder. A precoder 204 precodes the sequence to compensate for the transfer function of the magnetic recording channel 208 and equalizing filters. The write circuitry 206 modulates the current in the recording head coil to record a binary sequence onto the medium. A reference frequency $f_{ref}$ provides a write clock to the write circuitry 206.

The bit sequence is then provided to a variable gain amplifier 210 to adjust the amplitude of the signal. DC offset control 212 and loop filter/gain error correction 214 may be provided to control the adjustment of the VGA 210. Further, an asymmetry control unit 215 including an asymmetry adjustment unit 216 and asymmetry control 218 may be provided to compensate for magneto-resistive asymmetry effects.

The signal is then provided to a continuous time filter 220, which may be a Butterworth filter, for example, to attenuate high frequency noise and minimize aliasing into baseband after sampling. The signal is then provided to an analog to digital converter 222 to sample the output of the continuous time filter 220.

A finite impulse response filter 224 provides additional equalization of the signal to the desired response. The output of the FIR 224 is provided to an interpolated timing recovery unit 228 which is used to recover the discrete time sequence. The output of the interpolated timing recovery unit is used to provide a feedback control to the DC offset control 212, the gain error 214, the asymmetry control 218 and the FIR 224 control 226. The output of the interpolated timing recovery 228 is provided to a Viterbi detector 232 to provide maximum likelihood detection. Further, the ITR output is provided to a sync detector 234 according to the present invention. As will be described in greater detail below, the sync detector 234 detects the sync mark using phase information gleaned from having read the immediately preceding preamble. This information is then provided to the Viterbi detector 232 for use in sequence detection. The Viterbi detector output is then provided to the decoder 236 which decodes the encoding provided by the encoder 202.

After acquiring the preamble, the sync mark detector searches for the sync mark which marks the beginning of the data field. When the sync mark is detected, the sync mark detector enables the Viterbi detector 232 and decoder 236.

Figure 1:
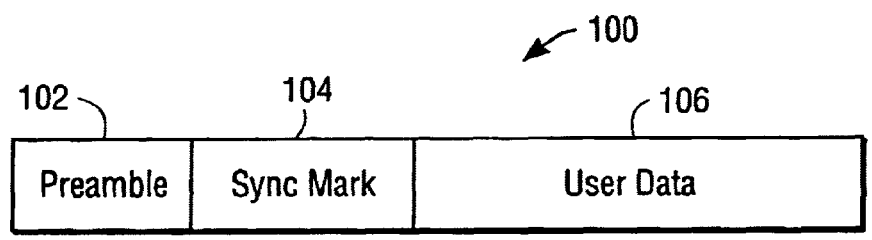
FIG. 1 is a diagram of an exemplary data format of user data.
Figure 3:
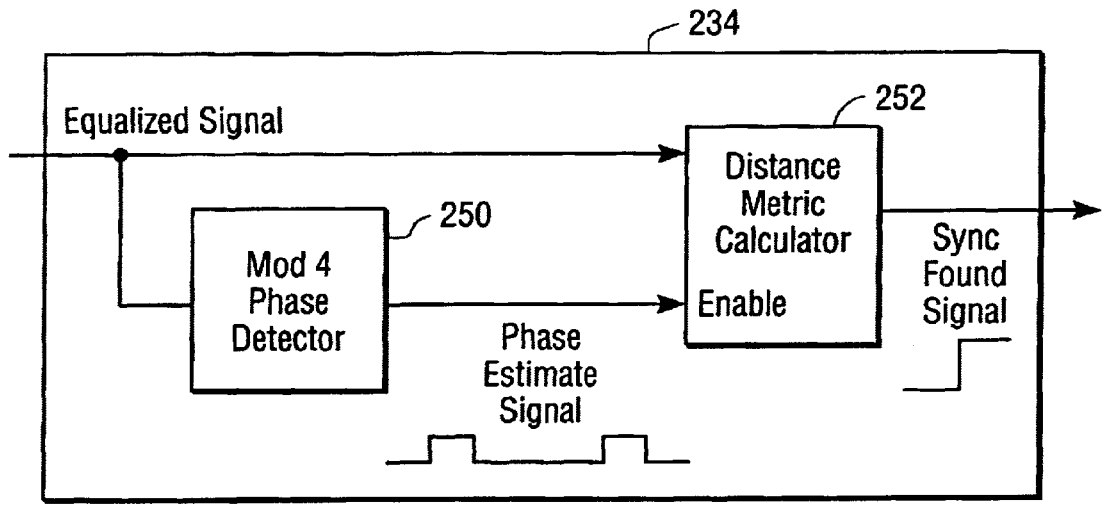
FIG. 3 is a block diagram of an exemplary synchronization detector according to an embodiment of the invention.

As shown in FIG. 3, an exemplary synchronization detector 234 according to one embodiment of the invention has two primary components: a modulo 4 phase detector 250 and a distance metric calculator 252. The modulo 4 phase detector 250 and the distance metric calculator 252 receive as inputs the equalized signal. The modulo 4 phase detector 250 uses the preamble readback signal to estimate the phase modulo 4 bit periods. The period 4 modulo 4 phase detector 250 outputs a signal indicating this estimate to enable the distance metric calculator 252. This signal is used by the distance metric calculator 252 to limit its search for the synchronization mark to every m-th bit position, where m is either 2 or 4.

The phase detector 250 accumulates phase information during a phase accumulation window. This window is timed to be near the end of the preamble and is typically 20 bits in length. The phase detector accumulates two sums, $c_0$ and $c_1$:

$$c_0 = \left(\sum_{i=i_0 (\bmod 4)} x_i\right) - \left(\sum_{i=(i_0-2)(\bmod 4)} x_i\right)$$

$$c_1 = \left(\sum_{i=(i_0+1)(\bmod 4)} x_i\right) - \left(\sum_{i=(i_0-1)(\bmod 4)} x_i\right).$$

In addition to satisfying the congruencies specified in the index sets, the index i is restricted to the phase accumulation window. Advantageously, each of the two accumulators can operate on a half-speed clock. In effect, a correlation is performed between the the preamble and a pair of preamble signals, delayed from one another.

The values $c_0$ and $c_1$ determine a phase estimate for sample index $i_0$.

TABLE 1

Phase detector PR4

| $[X_{i0}, \ldots, X_{i0+3}]$ | $C_0$ | $C_1$ | Comparison result | Phase estimate |
|---|---|---|---|---|
| [1,1,−1,−1] | L | L | ($C_0 \geq 0$) and ($C_1 \geq 0$) | 0 |
| [1,−1,−1,1] | L | −L | ($C_0 \geq 0$) and ($C_1 < 0$) | 1 |
| [−1,−1,1,1] | −L | −L | ($C_0 < 0$) and ($C_1 < 0$) | 2 |
| [−1,1,1,−1] | −L | L | ($C_0 < 0$) and ($C_1 \geq 0$) | 3 |

Table 1 shows the expected values of $c_0$ and $c_1$ after reading the samples in the phase accumulator window in the case of PR4 equalized data. Here, L is a positive number whose exact value depends on the width of the accumulator window and the gain of the signal. The comparisons of $c_0$ and $c_1$ with zero determine the corresponding phase estimate given in the last column.

Table 2 represents the same information in the case of EPR4 equalized data.

TABLE 2

Phase detector EPR4

| $[X_{i0}, \ldots, X_{i0+3}]$ | $C_0$ | $C_1$ | Comparison result | Phase estimate |
|---|---|---|---|---|
| [2, 0, −2, 0] | 2L | 0 | ($C_0 \geq C_1$) and ($C_0 \geq -C_1$) | 0 |
| [0, −2, 0, 2] | 0 | −2L | ($C_0 \geq C_1$) and ($C_0 < -C_1$) | 1 |
| [−2, 0, 2, 0] | −2L | 0 | ($C_0 < C_1$) and ($C_0 < -C_1$) | 2 |
| [0, 2, 0, −2] | 0 | 2L | ($C_0 < C_1$) and ($C_0 \geq -C_1$) | 3 |

The comparisons of $c_0$ and $c_1$ and $-c_1$ and determine the corresponding phase estimate given in the last column. The tables for further extensions of PR4 equalization are similar to Tables 1 or 2.

Figures 4A, 4B, 5, 6:
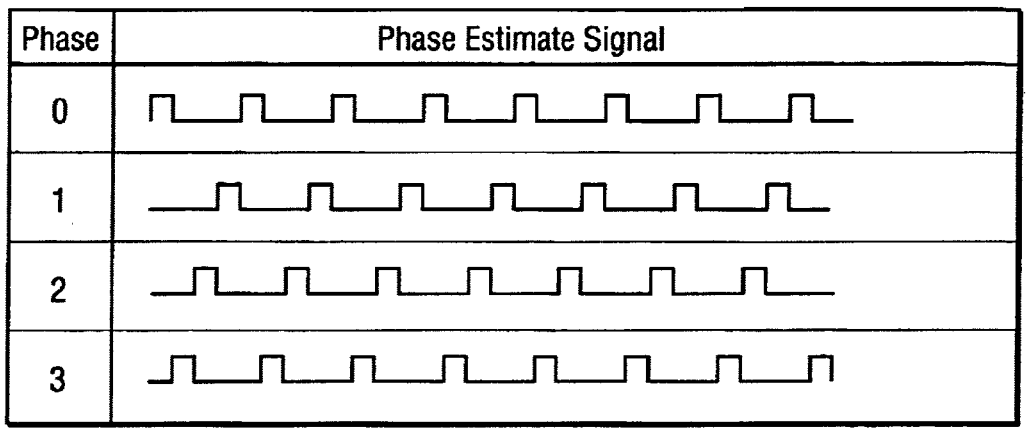
FIG. 4A is a diagram illustrating exemplary phase estimate signals.
FIG. 4B is a diagram of exemplary signal, detected phase, and phase estimate signal according to an embodiment of the invention.
FIG. 5 is a table of the squared Euclidean distance between the synchronization mark and shifts of the synchronization mark into the preamble by multiples of four bits for an EPR4 system.
FIG. 6 is a table of the squared Euclidean distance between the synchronization mark and shifts of the synchronization mark into the preamble by multiples of two bits for an EPR4 system.

The phase estimate made by the phase detector is communicated to the distance metric calculator via a phase estimate signal. More particularly, FIG. 4A shows the phase estimate signals corresponding to the four phases, in one embodiment. The phase estimate signal is high at each bit index at a fixed phase modulo four bit periods. For each index i at a fixed offset from a rising edge of the phase offset signal, the distance metric calculator calculates the distance between the received sample sequence $[x_i, x_{i+1}, \ldots, x_{i+L-1}]$ and the ideal sample sequence $[s_0, s_1, \ldots, s_{L-1}]$ expected at the synchronization mark. The first index i (in the qualification window) at which this distance does not exceed a qualification threshold is asserted to be the location of the synchronization mark. For example, in one embodiment, for the period 4 version for EPR4, the NRZ version of the sync mark is seven bits in length and follows the preamble as . . . 1 1 0 0 1 1 0 0 0 0 1 1 1 0 0. This results in the EPR4 equalized sequence [. . . 0 2 0−2 0 2 0−2−1 0 1 2 1−1−2]. FIG. 4B depicts the EPR4 equalized signal, the corresponding phase signal, and the corresponding phase estimate signal. In this example, the phase estimate signal is high during bit periods at phase 3. Since the sync mark is known to begin at phase 3, the distance metric calculator calculates metrics for those data sequences $[x_i, x_{i+1}, \ldots, x_{i+6}]$ where i has phase 3. More generally, for each index i at a fixed offset from a rising edge of the phase offset signal, the distance metric calculator 252 calculates the squared Euclidean distance between the sample-by-sample slicer estimates $[\bar{x}_i, \bar{x}_{i+1}, \ldots, \bar{x}_{i+L-1}]$ of the received sample sequence and the ideal sample sequence $[s_0, s_1, \ldots, s_{L-1}]$ expected at the synchronization mark. The first index i (in the qualification window) at which this metric does not exceed a qualification threshold is asserted to be the location of the synchronization mark.

More particularly, the distance metric calculator first calculates the distance between the data sequence $[x_i, x_{i+1}, \ldots, x_{i+6}]$ and the expected sequence $[s_0, s_1, \ldots, s_6]$ to produce a sequence of distances $[d_i, d_{i+1}, \ldots, d_{i+6}]$, where i has phase 3. Each d is then squared and the entire sequence is then summed to produce the total squared distance $$d_{tot} \cdot d_{tot} = \sum_{i=1}^{6} (d_i)^2 = \sum_{i=1}^{6} (s_i - x_i)^2$$

In this example, the symbols of the data sequence and the expected data sequence are EPR4 symbols of the set $\{-2,-1,0,1,2,\}$. Thus the symbols of the squared distance sequence are of the set $\{0,1,4,9,16\}$. One embodiment of the invention uses a look up table to produce the symbols of the squared distance sequence and uses an adder to sum these symbols to produce the total squared distance.

FIG. 5 shows the squared Euclidean distance between the synchronization mark and shifts of the synchronization mark into the preamble by multiples of four bits for the example discussed above. Assuming the phase estimator correctly estimates the phase of the preamble, these are the shifts at which the distance metric calculator computes the squared distance between the sequence of seven (7) slicer estimates of the signal and the sequence of seven (7) samples expected at the synchronization mark.

The period-two implementation of the distance metric calculator according to the present invention is appropriate when the relative polarity of the write and read signals is unknown. In fact, the period-two version determines the polarity as a by-product of determining the location of the synchronization mark.

In one embodiment of the period-two version for EPR4, the NRZ version of the synchronization mark is fourteen bits in length, and follows the preamble pattern as . . . 11001100 00111000001111. This results in the EPR4 equalized sequence [. . . ,0,2,0,-2,0,2,0,-2,-1,0,1,2,1,-1,-2,-1,0,0,1, 2,1,0]. Since the correct polarity of the readback signal is unknown, we must compute the squared distance between the sequence of slicer estimates $[\bar{x}_i, \bar{x}_{i+1}, \ldots, \bar{x}_{i+13}]$ and two versions of the expected synchronization sequence: the sequence $[-1,0,1,2,1,-1,-2,-1,0,0,1,2,1,0]$ at those indices i that the phase detector determines to be just after a –2 in the preamble on the one hand, and the sequence $[1,0,-1,-2,-1, 1,2,1,0,0,-1,-2,-1,0]$ at those indices i that the phase detector determines to be just after a 2 in the preamble on the other hand.

FIG. 6 shows the squared Euclidean distance between the synchronization mark and shifts of the synchronization mark into the preamble by multiples of two bits. When the shift is by an odd multiple of two, the polarity of the expected synchronization mark is flipped. Assuming the phase estimator correctly estimates the phase of the preamble, these are the shifts at which the distance metric calculator computes the squared distance between the sequence of fourteen (14) slicer estimates of the signal and the sequence of fourteen (14) samples expected at the synchronization mark. The minimum squared distance between the synchronization mark and any of its (polarity adjusted) shifts into the preamble is 37. If the qualification threshold to 9 (meaning that synchronization is determined to exist at the first time the metric does not exceed 9), then the minimum noise squared-amplitude that could cause early synchronization would be at least $$(\sqrt{37}-\sqrt{9})^2 \geq 9$$

Also the minimum squared-noise amplitude that could cause missed synchronization would exceed 9. A similar analysis can be applied to the period-four version.

What is claimed is:

1. A sync mark detector, comprising:
a phase detector configured to detect a phase of a preamble by calculating correlations between said preamble and a plurality of idealized preamble signals, said preamble including a sequence of data samples, each of said plurality of idealized preamble signals including a sequence of ideal samples, said idealized preamble signals being delayed from one another; and
a distance metric calculator responsive to said phase detector to establish an initial index using the phase of the preamble detected by said phase detector and configured to calculate a plurality of distance metrics between a predetermined sequence of ideal samples and a plurality of sequences of data samples, the plurality of sequences of data samples beginning at every mth index after said initial index, where m is an integer greater than one (1).

2. A sync mark detector according to claim 1, wherein said phase detector is a modulo 4 phase detector and said preamble is a periodic preamble having period 4 m bits.

3. A sync mark detector according to claim 2, wherein said phase detector accumulates the correlation sums below:

$$c_0 = \left( \sum_{i=i_0 (\bmod 4)} x_i \right) - \left( \sum_{i=(i_0-2)(\bmod 4)} x_i \right)$$

$$c_1 = \left( \sum_{i=(i_0+1)(\bmod 4)} x_i \right) - \left( \sum_{i=(i_0-1)(\bmod 4)} x_i \right).$$

4. A method for detecting a sync mark, comprising:
determining a phase of a preamble by calculating correlations between said preamble and a plurality of idealized preamble signals, said preamble including a sequence of data samples, each of said plurality of idealized preamble signals including a sequence of ideal samples, said idealized preamble signals being delayed from one another;
using said phase to establish an initial index for detecting said sync mark; and
calculating a plurality of distance metrics between a predetermined sequence of ideal samples and a plurality of sequences of data samples, the plurality of sequences of data samples beginning at every mth index after said initial index, where m is an integer greater than one (1), wherein said sync mark is detected if said distance metric meets a predetermined threshold.

5. A method according to claim 4, wherein said preamble is a periodic preamble having period 4 m bits.

6. A method according to claim 5, including accumulating the correlation sums below:

$$c_0 = \left(\sum_{i=i_0(\text{mod}\,4)} x_i\right) - \left(\sum_{i=(i_0-2)(\text{mod}\,4)} x_i\right)$$

$$c_1 = \left(\sum_{i=(i_0+1)(\text{mod}\,4)} x_i\right) - \left(\sum_{i=(i_0-1)(\text{mod}\,4)} x_i\right).$$

7. A sampled amplitude read channel, comprising:

means for receiving a signal, said signal including a preamble and a sync mark;

means for detecting a phase of said preamble by calculating correlations between said preamble and a plurality of idealized preamble signals, said preamble including a sequence of data samples, each of said plurality of idealized preamble signals including a sequence of ideal samples, said idealized preamble signals being delayed from one another;

means for establish an initial index in response to said detecting means using the phase of the preamble detected by said means for detecting; and means for calculating a distance metric between a predetermined sequence of ideal samples and a sequence of data samples beginning at every mth index after said initial index, where m is an integer greater than one (1).

8. A sampled amplitude channel according to claim 7, wherein said detecting means is a modulo 4 m phase detector and said preamble is a periodic preamble having period 4 m bits.

9. A sampled amplitude channel according to claim 8, wherein said detecting means accumulates the correlation sums below:

$$c_0 = \left(\sum_{i=i_0(\text{mod}\,4)} x_i\right) - \left(\sum_{i=(i_0-2)(\text{mod}\,4)} x_i\right)$$

$$c_1 = \left(\sum_{i=(i_0+1)(\text{mod}\,4)} x_i\right) - \left(\sum_{i=(i_0-1)(\text{mod}\,4)} x_i\right).$$

10. A sync mark detector, comprising:

a phase detector configured to detect a phase of a preamble and generate a phase estimate signal using accumulated phase information during a phase accumulation window; and a distance metric calculator configured to determine an initial index using said phase estimate signal from said phase detector and calculate a plurality of distance metrics between a predetermined sequence of ideal samples and a plurality of sequences of data samples, the plurality of sequences of data samples beginning at every mth index after said initial index, where m is an integer greater than one (1).

* * * * *

UNITED STATES PATENT AND TRADEMARK OFFICE
CERTIFICATE OF CORRECTION

PATENT NO. : 6,657,802 B1
DATED : December 2, 2003
INVENTOR(S) : Jonathan J. Ashley and Isaiah Carew It is certified that error appears in the above-identified patent and that said Letters Patent is hereby corrected as shown below:

Title page,
Item [57], ABSTRACT, replace "sued by the distance metric calculator to limit its search for the synchronization mark to every mth bit position, where m" with -- used by the distance metric calculator to limit its search for the synchronization mark to every $m$th bit position, where $m$ --

Column 3,
Line 60, replace
$$c_0 = \left(\sum_{i=i_0 (\bmod 4)} x_i\right) - \left(\sum_{i=(i_0-2)(\bmod 4)} x_i\right)$$
$$c_1 = \left(\sum_{i=(i_0+1)(\bmod 4)} x_i\right) - \left(\sum_{i=(i_0-1)(\bmod 4)} x_i\right)$$
with
$$c_0 = \left(\sum_{i \equiv i_0 (\bmod 4)} x_i\right) - \left(\sum_{i \equiv (i_0-2)(\bmod 4)} x_i\right)$$
$$c_1 = \left(\sum_{i \equiv (i_0+1)(\bmod 4)} x_i\right) - \left(\sum_{i \equiv (i_0-1)(\bmod 4)} x_i\right)$$

Column 6,
Lines 31 and 60, replace "mth" with -- $m$th --
Lines 31, 35, 61 and 65, replace "m" with -- $m$ --

Line 40, replace
$$c_0 = \left(\sum_{i=i_0 (\bmod 4)} x_i\right) - \left(\sum_{i=(i_0-2)(\bmod 4)} x_i\right)$$
$$c_1 = \left(\sum_{i=(i_0+1)(\bmod 4)} x_i\right) - \left(\sum_{i=(i_0-1)(\bmod 4)} x_i\right)$$
with
$$c_0 = \left(\sum_{i \equiv i_0 (\bmod 4)} x_i\right) - \left(\sum_{i \equiv (i_0-2)(\bmod 4)} x_i\right)$$
$$c_1 = \left(\sum_{i \equiv (i_0+1)(\bmod 4)} x_i\right) - \left(\sum_{i \equiv (i_0-1)(\bmod 4)} x_i\right)$$

Column 7,
Line 5, replace
$$c_0 = \left(\sum_{i=i_0 (\bmod 4)} x_i\right) - \left(\sum_{i=(i_0-2)(\bmod 4)} x_i\right)$$
$$c_1 = \left(\sum_{i=(i_0+1)(\bmod 4)} x_i\right) - \left(\sum_{i=(i_0-1)(\bmod 4)} x_i\right)$$
with
$$c_0 = \left(\sum_{i \equiv i_0 (\bmod 4)} x_i\right) - \left(\sum_{i \equiv (i_0-2)(\bmod 4)} x_i\right)$$
$$c_1 = \left(\sum_{i \equiv (i_0+1)(\bmod 4)} x_i\right) - \left(\sum_{i \equiv (i_0-1)(\bmod 4)} x_i\right)$$

Line 24, replace "mth" with -- $m$th --
Lines 25, 27 and 28, replace "m" with -- $m$ --

UNITED STATES PATENT AND TRADEMARK OFFICE
CERTIFICATE OF CORRECTION

PATENT NO. : 6,657,802 B1
DATED : December 2, 2003
INVENTOR(S) : Jonathan J. Ashley and Isaiah Carew It is certified that error appears in the above-identified patent and that said Letters Patent is hereby corrected as shown below:

Column 8,
Line 5, replace
$$``c_0 = \left(\sum_{i \equiv i_0 (\text{mod } 4)} x_i\right) - \left(\sum_{i \equiv (i_0 - 2)(\text{mod } 4)} x_i\right)$$
$$c_1 = \left(\sum_{i \equiv (i_0 + 1)(\text{mod } 4)} x_i\right) - \left(\sum_{i \equiv (i_0 - 1)(\text{mod } 4)} x_i\right)"$$
with
$$-- c_0 = \left(\sum_{i \equiv i_0 (\text{mod } 4)} x_i\right) - \left(\sum_{i \equiv (i_0 - 2)(\text{mod } 4)} x_i\right)$$
$$c_1 = \left(\sum_{i \equiv (i_0 + 1)(\text{mod } 4)} x_i\right) - \left(\sum_{i \equiv (i_0 - 1)(\text{mod } 4)} x_i\right) --$$

Line 25, replace "mth" with -- *m*th --
Line 25, replace "m" with -- *m* --

Signed and Sealed this

Twentieth Day of July, 2004

JON W. DUDAS
*Acting Director of the United States Patent and Trademark Office*